United States Patent [19]

Widner

[11] 3,985,034

[45] Oct. 12, 1976

[54] HIGH "G" GYRO WITH FLUIDIC EXHAUST CONTROL FOR FLUIDIC BEARING

[75] Inventor: Rayburn K. Widner, Arab, Ala.

[73] Assignee: The United States of America as represented by the Secretary of the Army, Washington, D.C.

[22] Filed: Feb. 28, 1975

[21] Appl. No.: 554,261

[52] U.S. Cl. ................... 74/5.7; 74/5.12; 308/DIG. 1
[51] Int. Cl.² .............. G01C 19/12; G01C 19/16; G01C 19/26
[58] Field of Search ............ 74/5.1, 5.12, 5.14, 74/5.7; 308/DIG. 1

[56] References Cited
UNITED STATES PATENTS

| | | | |
|---|---|---|---|
| 2,474,072 | 6/1949 | Stoner | 308/DIG. 1 |
| 2,695,199 | 11/1954 | Blizard | 308/DIG. 1 |
| 3,115,784 | 12/1963 | Parker | 74/5.7 X |
| 3,238,792 | 3/1966 | Unterberger | 74/5.7 |
| 3,528,300 | 9/1970 | Paine | 74/5.1 X |
| 3,807,239 | 4/1974 | Widner et al. | 74/5.7 |

*Primary Examiner*—Samuel Scott
*Assistant Examiner*—F. D. Shoemaker
*Attorney, Agent, or Firm*—Nathan Edelberg; Robert P. Gibson; James T. Deaton

[57] ABSTRACT

A high "G" gyro that has a rotor mounted relative to a stator by a fluidic bearing with fluidic exhaust control means for producing a lower pressure at the exhaust for the fluidic bearing to prevent the exhaust from the fluidic bearing from impinging on other portions of the rotor to cause error signals to be produced. By locating the exhaust for the fluidic bearing radially outwardly from the inlet ports to the fluidic bearing, and by producing a lower pressure at the exhaust, the exhaust fluids from the bearing are attracted to the exhaust and prevented from impinging and exerting undesirable forces on the rotor.

4 Claims, 1 Drawing Figure

U.S. Patent    Oct. 12, 1976    3,985,034
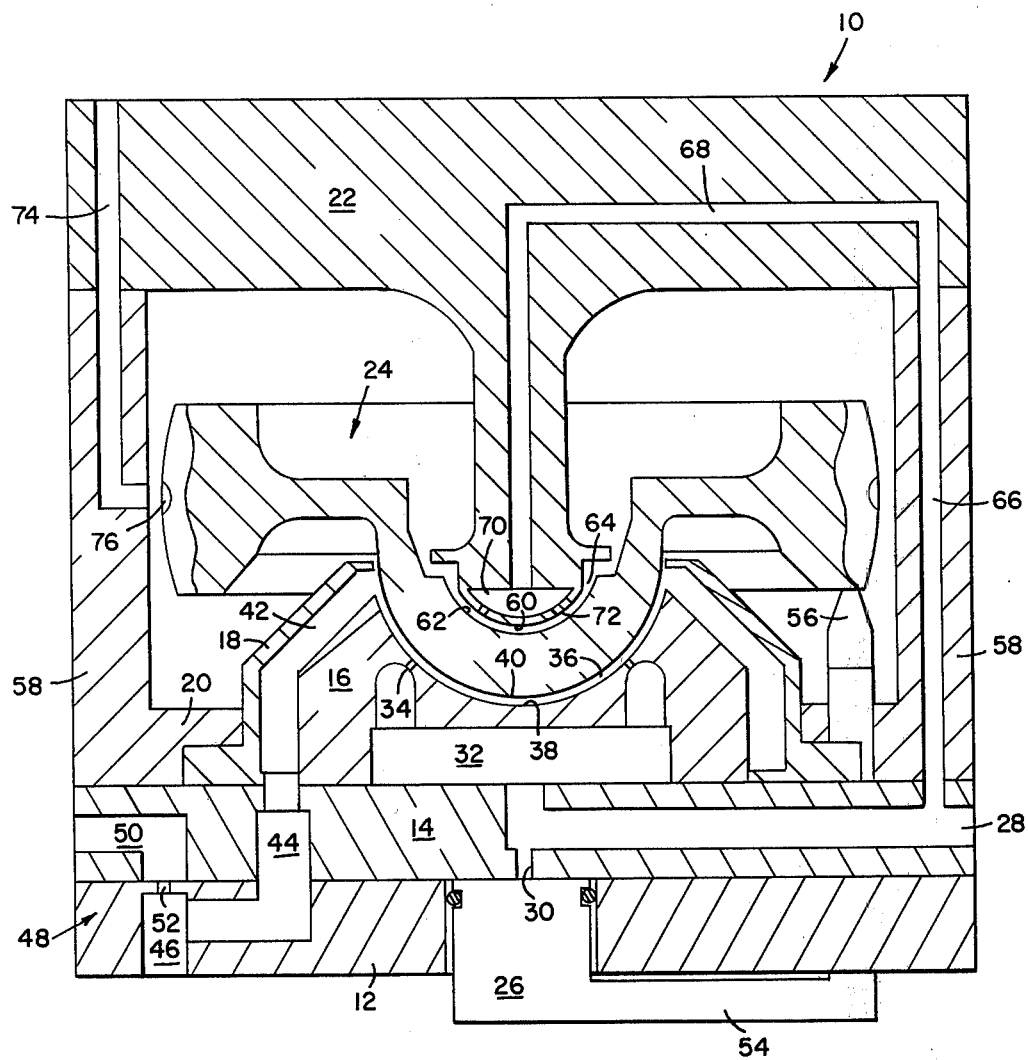

HIGH "G" GYRO WITH FLUIDIC EXHAUST CONTROL FOR FLUIDIC BEARING

DEDICATORY CLAUSE

The invention described herein may be manufactured, used, and licensed by or for the Government for Governmental purposes without the payment to me of any royalties thereon.

BACKGROUND OF THE INVENTION

In the past, in high "G" gyros which have an air or fluidic bearing with the air being exhausted upwardly and outwardly toward a portion of the rotor, a problem has existed in that this exhausting fluid exerts forces on the rotor which cause undesirable error signals to be produced. Therefore, there is a need in gyros of this type in which the exhausting fluid from the fluidic bearing can be exhausted so as to prevent the fluid from impinging upon the rotor and exerting forces thereon that cause the rotor to produce undesirable error signals.

Accordingly, it is an object of this invention to provide a high "G" gyro which has a fluidic bearing with an exhaust for exhausting the fluid away from the rotor without exerting undesirable forces thereon.

Another object of this invention is to provide a high "G" gyro in which the outlet for the fluidic bearing support has means that causes the fluid from the bearing to be attracted away from the rotor.

Still another object of this invention is to provide a high "G" gyro in which a jet type nozzle arrangement is used as a pump to create a low pressure at an exhaust for the bearing of the gyro.

Other objects and advantages of this invention will be obvious to those skilled in this art.

SUMMARY OF THE INVENTION

In accordance with this invention, a high "G" gyro is provided that has a rotor mounted in a stator housing with a fluidic bearing therebetween. The fluidic bearing has an inwardly spaced circumferential ring of openings for injecting fluid into the bearing and a radially outwardly spaced exhaust for carrying the fluid away. A jet type pump is connected to the exhaust to produce a low pressure at the exhaust and cause the exhaust gases from the air bearing to be attracted to the exhaust and prevent them from exerting undesirable forces on the rotor in the form of error signals.

BRIEF DESCRIPTION OF THE DRAWING

In the drawing:

The single FIGURE of the drawing is a sectional view of a high "G" gyro according to this invention.

DESCRIPTION OF THE PREFERRED EMBODIMENT

Referring now to the drawing, gyro 10 includes a stator housing made up of base members 12 and 14, bearing mount 16, shroud 18, intermediate section 20 and upper section 22. A rotor 24 is rotatably mounted within the stator housing. Base member 12 has piston 26 mounted therein and a low pressure inlet passage 28 in member 14 that communicates with the chamber formed between piston 26 and base member 12 by passage 30. Stator bearing mount 16 is secured to base members 12 and 14 in a conventional manner and has a chamber 32 defined between base member 14 and the lower surface thereof. Chamber 32 receives fluid from low pressure inlet 28 and communicates the fluid through a plurality of circumferentially arranged ports 34 into fluidic bearing space 36 that is defined by the upper concave spherical surface 38 of bearing mount 16 and convex spherical surface 40 of rotor 24. Shroud 18 around bearing mount 16 defines a circumferential exhaust 42 from fluidic bearing space 36 that exhausts into passage 44 in base members 12 and 14 to jet outlet 46 in base member 12. Base members 12 and 14 have jet pump 48 mounted therein that includes inlet passage 50 that is provided with fluid from an appropriate source and jetted through orifice 52 into outlet 46. The fluid jetting through orifice 52 past the end of passage 44 creates a suction or low pressure within passage 44 and circumferential exhaust 42 to attract the exhausting fluid from fluidic bearing space 36 and prevent this fluid from being exhausted around shroud 18 and cause undesirable forces to be exerted on rotor 24. It is also pointed out that orifice 52 and jet outlet 46 are at a 90° angle to outlet passage 44 where outlet passage 44 opens into jet outlet 46 to create the low pressure in passage 44 and exhaust 42.

Piston 26 has a plurality of radial arms 54 (only one of which is shown) that are connected to caging members 56 (only one of which is shown). Piston 26 is normally held in the retracted position shown by friction to maintain caging members 56 in contact with a lower surface of rotor 24 to maintain rotor 24 in a caged positon prior to its going into operation.

Intermediate stator housing 20 has three legs 58 that are integral with member 20 and secured to base members 12 and 14 in a conventional manner, and legs 58 are secured at the upper ends thereof to upper housing 22 in a conventional manner.

In some applications, it is desirable to have an upper bearing on the rotor and as illustrated, upper housing 22 has an upper convex spherical surface 60 that forms with concave spherical surface 62 of rotor 24 a fluidic bearing space 64. Fluid for this bearing space is provided from inlet 28 through passage 66 in one of legs 58 to passage 68 in upper member 22 which communicates the fluid into chamber 70 of upper member 22. Fluid from chamber 70 is communicated through a plurality of circumferentially arranged ports 72 into air bearing space 64. The exhausting fluid from air bearing space 64 can also be used for pickoff purposes if desired.

Rotor 24 can be brought up to speed by any conventional means. However, as illustrated fluid from an external source is provided through passage 74 to bucket 76 on rotor 24 to bring rotor 24 up to speed when desired.

In operation, fluid is supplied to passage 28 for supplying fluid to piston 26 to actuate uncaging members 56 and supply fluid to fluid bearing spaces 36 and 64 and at the same time fluid is supplied to passage 74 to cause rotor 24 to be brought up to speed. Also, fluid is simultaneously provided at inlet 50 to be jetted through orifice 52 and cause a low pressure to be created at circumferential exhaust 42 and attract the exhausting fluid from fluid bearing space 36 and prevent this fluid from exerting undesirable forces on rotor 24 which would cause undesirable error signals to be produced by the rotor. As can be seen, it is obvious that by providing low pressure exhaust 42, the exhausting fluid from bearing space 36 is prevented from exerting undesirable forces on the rotor.

I claim:

1. A gyro comprising a stator housing, a rotor rotatably mounted in said stator housing by fluidic bearing means, said fluidic bearing means having a plurality of circumferentially arranged ports that have means for admitting fluid to said plurality of circumferentially arranged ports and said plurality of circumferentially arranged ports opening into a fluidic space defined between said rotor said rotor stator housing, exhaust means consisting of a circumferentially arranged exhaust from said fluidic bearing space and being located radially outwardly from said ports, and means for providing a reduced pressure at said circumferentially arranged exhaust to cause the fluid from the fluidic bearing space to be attracted to said exhaust and prevent the fluid from the bearing space from exerting undesirable forces on said rotor, said means for providing said reduced pressure at said circumferentially arranged exhaust consisting of a jet arrangement in said stator housing in which an outlet passage from said circumferential exhaust communicates at a 90° angle with a jet outlet that receives fluid through a restricted orifice from an inlet passage to cause the fluid being jetted through said orifice and into said jet outlet to cause a low pressure to be produced in said outlet passage and said circumferential exhaust.

2. A gyro as set forth in claim 1, wherein said fluidic bearing means has a spherical shaped surface on said rotor that mates with a similar spherical shaped surface on said stator housing.

3. A gyro as set forth in claim 2, wherein caging means are provided for maintaining the rotor in a caged position until fluid is provided to said fluidic bearing means, said caging means being actuated by the same fluid as that supplied to said fluidic bearing means.

4. A gyro as set forth in claim 3, wherein said fluidic bearing means includes another spherical surface on said rotor that mates with another spherical surface on said stator housing to define another fluidic bearing surface between said rotor and said stator housing, and passage means in said stator housing communicating fluid to said other fluidic bearing space.

* * * * *

UNITED STATES PATENT OFFICE
CERTIFICATE OF CORRECTION

Patent No. 3,985,034　　　　　Dated October 12, 1976

Inventor(s) Rayburn K. Widner

It is certified that error appears in the above-identified patent and that said Letters Patent are hereby corrected as shown below:

Column 3, line 9, "said rotor", second occurrence should be cancelled and -- and said -- should be inserted therefor.

Signed and Sealed this

Eighth Day of March 1977

[SEAL]

Attest:

RUTH C. MASON　　　　　　　C. MARSHALL DANN
*Attesting Officer*　　　　　*Commissioner of Patents and Trademarks*